Patented Jan. 7, 1936

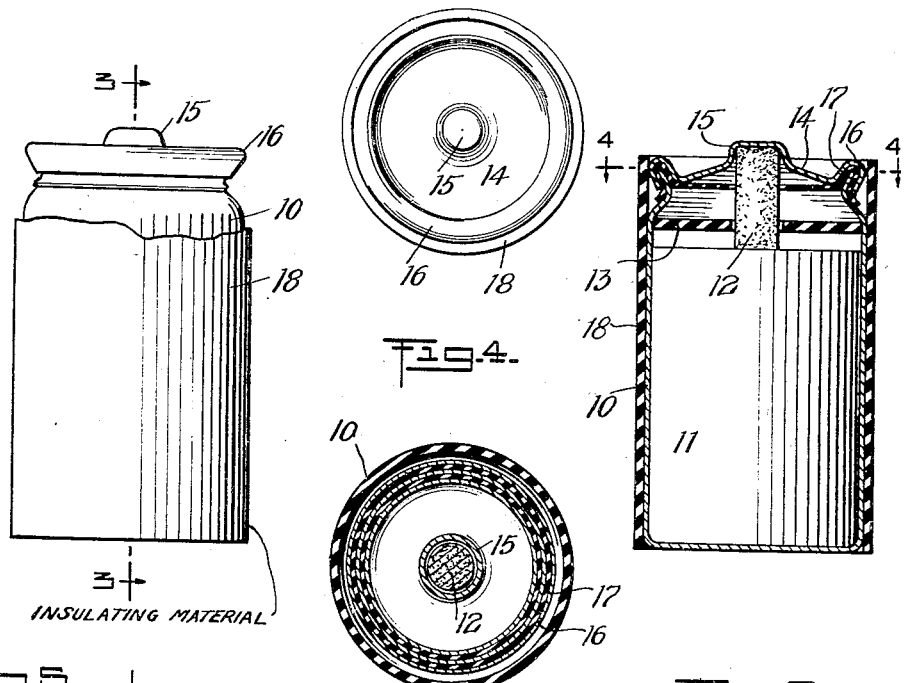

2,026,615

UNITED STATES PATENT OFFICE 2,026,615

DRY CELL

Peter Corigliano, St. Albans, and Louis Platzman, Brooklyn, N. Y., assignors to Bright Star Battery Company, Hoboken, N. J., a corporation of New York Application March 2, 1932, Serial No. 596,222

2 Claims. (Cl. 136—133)

This invention relates to dry cells and has for an object an inexpensive and efficient dry cell sealed with a metal cover and having provision for effectively preventing accidental short circuiting of the cell.

A dry cell embodying this invention comprises the usual metal cup within which is contained a cartridge having the usual central carbon electrode. The closure for the cup comprises a metal cover which has a central recess into which the carbon electrode projects and makes electrical contact with the cover. The metal cover is attached at its periphery to the upper end of the cup and insulating material is interposed between the metal cover and the rim of the cup. This closure arrangement eliminates the use of the sealing compounds previously used and which are subject to many defects. It permits the use of a larger cartridge in the same size container inasmuch as the thickness of the cover is much less than the thickness of the usual sealing compound. The use of a larger cartridge results in increased battery life. It also provides a tight seal regardless of temperature conditions, as well as effectively prevents the possibility of accidental short circuiting. A further advantage lies in the fact that such a battery is less expensive to manufacture than batteries using sealing compound.

Other objects, novel features and advantages of this invention will be apparent from the following specification and accompanying drawing, wherein:

Fig. 1 is an elevation of a flashlight battery embodying the invention;

Fig. 2 is a plan view thereof;

Fig. 3 is a section on the line 3—3 of Fig. 1;

Fig. 4 is a section on the line 4—4 of Fig. 3;

Fig. 5 is an elevation of a large size cell embodying the invention, and

Fig. 6 is a section on the line 6—6 of Fig. 5.

Referring now more especially to Figs. 1 to 4 inclusive, the battery consists of a metal cup 10 in which is contained a cartridge 11, centrally of which is located a carbon electrode 12, the upper end of which projects slightly above the rim of the cup. A paper washer 13 is arranged within the cup and has an aperture through which the carbon electrode extends, this washer serving to center the carbon electrode during assembly of the battery and also to form a gas chamber in the finished cell.

The cup 10 is closed by a metal cover 14 having a central upward offset 15 into which projects the upper end of the carbon electrode. The annular cover 14 is formed to provide an annular pocket 16 within which is received the rim of the cup 10. Insulating material is interposed between the surfaces of the pocket 16 and the sides of the pocket are pressed against the rim of the cup to fasten the cover to the cup to form a gas-tight seal between the cup and cover. Preferably, the insulating material comprises a disk 17 of some plastic material and having high insulating properties, the periphery of the disk being arranged between the cup rim and the cover.

A plastic material which has been found admirably adapted for this purpose is celluloid. A disk of celluloid formed at its periphery to overlie the rim of the cup and be received in the pocket 16 is arranged between the cup and the cover during assembly and when the cover is crimped to the cup the periphery of the insulating disk is bound in place, and effectively insulates the cup from the cover. The pliability and toughness of the celluloid prevent fracture of it during the crimping operation, thus preventing any possibility of leak between the cup and the cover. The cover is kept in good contact with the central electrode by the resiliency of the metal of which it is formed. The cup is provided with the usual surrounding paper shell 18.

The cell above described is provided with a tight seal which will withstand varying temperature conditions and will also withstand rough usage, thereby preventing drying out of the cartridge. Furthermore, accidental short circuiting of the cell is effectively prevented since the cover is insulated from the cup and the latter is enclosed in the usual paper jacket. In order to short circuit this cell, it is necessary either to remove the paper jacket or tear a hole in the same.

Referring now to Figs. 5 and 6, the large type cell herein disclosed consists of a metal cup 20 in which is contained a cartridge 21 provided with a centrally arranged carbon electrode 22, the upper end of which projects slightly above the rim of the cup and has a paper washer 23 associated therewith. The cup is closed by a metal cover 24 having a central upward offset 25 into which projects the upper end of the carbon electrode. The upper rim of the cup extends into an annular pocket 26 provided in the cover 24 and a disk 27 of insulating material has its periphery interposed between the surfaces of the pocket and the rim of the cup, thereby insulating the cup from the cover. The usual paper shell 28 surrounds the cup 20. A threaded stud 29 is riveted to the cover 24 centrally thereof and projects upwardly therefrom in the manner common to cells of this type to act as a binding post. A second binding post 30 is connected to the cup 20 and is spaced or insulated from the cover 24, thereby preventing short circuiting of the battery.

It is apparent that this cell has the same advantages as previously outlined in connection with the cell disclosed in Figs. 1 to 4. Furthermore, it is to be understood that various modifications may be made in the cells above described, without in any way departing from the spirit of the invention as defined in the appended claims.

I claim:

1. A dry cell comprising a metal cup containing a cartridge having a centrally arranged electrode, and a continuous metal cover having a rigid sealing connection between its periphery and the rim of said cup, said cover and electrode being in electrical contact with each other and said cover being insulated from said cup.

2. A dry cell comprising a metal cup containing a cartridge having a centrally arranged electrode, a continuous metal cover having a down-turned flange surrounding the rim of said cup and constituting the sole sealing means for said cup, and insulating material interposed between said cover and cup, the edge of said cup being permanently clamped between said flange and the main body of said cover, and an outwardly projecting recess in the cover into which said electrode extends in electrical contact therewith.

PETER CORIGLIANO.
LOUIS PLATZMAN.